Aug. 27, 1963     J. J. WERTH     3,102,228

ALTERNATING CURRENT VOLTAGE REFERENCE

Filed May 12, 1958

INVENTOR
John J. Werth
BY
AGENT

United States Patent Office 3,102,228
Patented Aug. 27, 1963

3,102,228
ALTERNATING CURRENT VOLTAGE
REFERENCE
John J. Werth, Paramus, N.J., assignor to ACF Industries, Incorporated, New York, N.Y., a corporation of New Jersey
Filed May 12, 1958, Ser. No. 734,578
1 Claim. (Cl. 323—66)

This invention is directed to an alternating current voltage reference source.

In many applications incorporating electromechanical instruments or devices, it is a requisite that there be available an accurately regulated voltage source. Some applications require an alternating voltage consisting substantially of only the fundamental frequency with no harmonic frequencies included in the regulated voltage. Such applications often require a fast response in the order of 1 to 10 milliseconds. Normal rectification systems often cannot respond faster than 15 millisecond with medium accuracy. Where a very high accuracy is required, conventional rectification systems will provide a response time of 100 to 500 millisecond.

It is, therefore an object of this invention to provide a novel regulated alternating voltage source of great accuracy and rapid time response.

It is a further object of the invention to provide a novel alternating current voltage source providing a regulated voltage of a single fundamental frequency.

It is another object of the invention to provide a novel regulated alternating current voltage source of great accuracy and a single fundamental frequency.

The invention, described in greater detail below, is that in which an unregulated alternating current voltage is clipped to a low level by double anode zener diodes to produce a square wave, which in turn is filtered to provide a precision sinusoidal reference voltage. The filtering action eliminates the harmonics of the square wave and provides a resulting sinusoidal wave of fundamental frequency.

Figure 1:
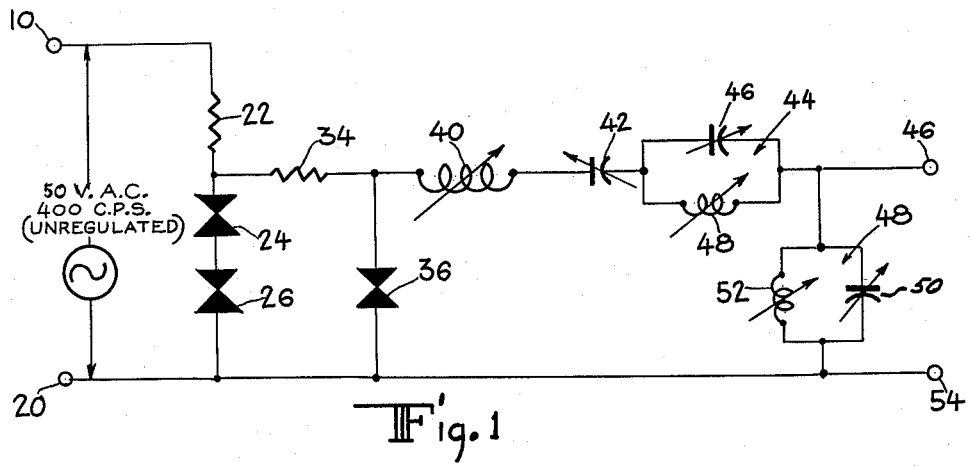
FIG. 1 is a schematic circuit diagram of the novel voltage reference system in accordance with the invention.

FIG. 1 represents a circuit diagram of a voltage regulating system in accordance with the invention. An unregulated alternating current voltage is connected across terminals 10 and 20 of the system. The alternating current source may be of any desired type such as that having 115 volts and 60 cycles per second. That, given as an example in FIG. 1, provides an alternating current voltage of 50 volts R.M.S. and 400 cycles per second. Shunted across terminals 10 and 20 are a resistor 22 and a pair of zener diodes 24 and 26. Resistor 22 is one of 5000 ohms and limits the current through the diodes 24 and 26. The zener diodes 24 and 26 each consists of a semiconductor material having a double anode arrangement. Each diode will block the alternating current in both directions until a critical voltage is reached, at which voltage the diode becomes conducting. The two diodes 24 and 26 are those having commercial number IN226 and which have a critical breakdown voltage of approximately 10 volts.

Figure 2:
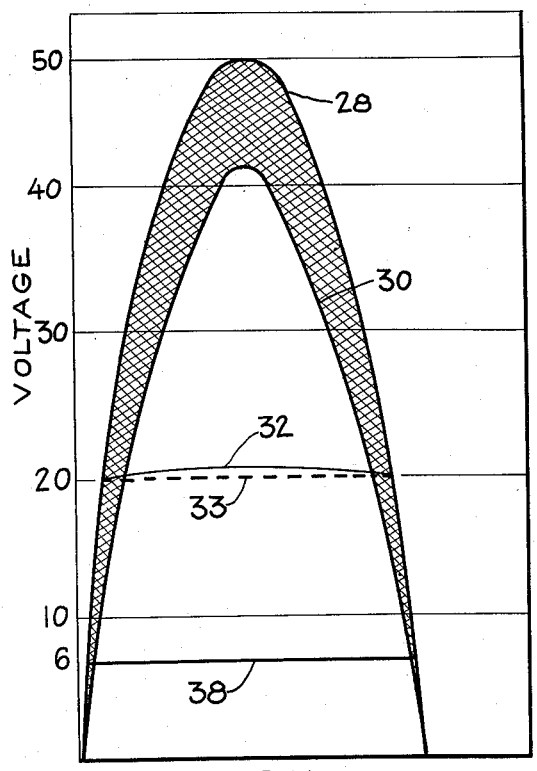
FIG. 2 is a graphical representation used in the discussion of the device in FIG. 1.

FIG. 2 discloses one half cycle of an alternating current voltage applied across terminals 10 and 20. Curves 28 and 30 represent variations of the voltage supplied by the unregulated source. The two diodes 24 and 26 will permit current to flow when their breakdown voltage has been reached or when there is approximately a 20 volt drop across the two diodes. The voltage wave form will at first follow the curve 28 or 30 and, then, at the point when the diodes break down, the voltage follows the curve 32 until the voltage drops below the critical 20 volts of the two diodes and again follows the curve of 28 or 30. FIG. 2 shows that the voltage curve portion 32 has a slight curvature. This is due to the inherent characteristic of the zener type diodes which possess a small dynamic impedance such that a variation in current flow through the diodes slightly changes the voltage across each diode.

Shunted across the two diodes 24 and 26 is a resistor 34 and a third zener diode 36. This arrangement is provided to further clip the voltage across diodes 24 and 26 to a lower value and provide a more accurately formed square voltage wave. Resistor 34 may be in the order of 2500 ohms to limit the current flow through diode 36. Diode 36 is one of the type having commercial number IN475, which is a semiconductor type having double anodes. Diode 36 further clips the voltage to one of substantially 6 volts. The effect of the inherent dynamic impedance of the diode to produce any variation in the breakdown voltage across diode 36 is negligible. The curved portion 32 of the voltage wave was introduced by the sine wave voltage applied across diodes 24 and 26 and as represented by the central portions of curves 28 and 30. However, the variation in voltage applied across diode 36 and as represented by the variation of the wave portion 32 from a straight line 33, is completely attenuated by the diode 36. Thus, the voltage across diode 36 is represented in FIG. 2 by curves 28 or 30 within the voltage range of from zero to six volts and by the substantially straight line portion 38 of the curve at six volts.

From an examination of FIG. 2, it is readily seen that in clipping the voltage at a low level there is retained a minimum portion of the variation of the input voltage represented by the hatched area between the curves 28 and 30. This results then in less variation in the square wave portion represented by the curve portion 38. That is, there is less trapezoidal error retained in the output wave, than if the input voltage were clipped at a higher elevel. As the input voltage changes from a condition represented by curve 28 to one represented by curve 30, the amplitude of the fundamental frequency of the wave changes by the introduction of a variation in the fundamental represented by the hatched area between the curves 28 and 30. This variation of the fundamental varies the output of the clipper. However, this variation of the output from the clipper is held to a minimum by clipping the voltage at the low level at which variations in the input voltage are minimized.

The output voltage of the clipper across the second clipping circuit, represented by diode 36, is a square wave as described above and one consisting of the fundamental frequency plus the odd harmonic frequencies of the fundamental. In certain applications requiring accurately regulated alternating voltage sources, it is necessary that the harmonic frequencies of the fundamental be eliminated as they tend to interfere with equipment which is designed for a single frequency and which would be adversely affected by other frequencies. To eliminate the odd harmonic frequencies of the square wave voltage across diode 36 a filtering circuit is provided which has a series arm consisting of an inductance coil 40 of 2.151 henries and a variable condenser 42 connected in series with a parallel blocking network or circuit 44, which consists of a variable condenser 46 and an inductance 48 of 1.137 henries. The blocking network 44 is in turn connected to an output terminal 46. Shunted between the output terminal 46 and diode 36 is a second parallel blocking network 48 also consisting of a variable condenser 50 and an inductance coil 52 of 2.151 henries. A second output terminal is shown at 54.

The series arm consisting of the inductance 40, condenser 42, and blocking network 44 is tuned to the fundamental frequency of the square wave voltage across diode 36. This portion of the circuit thus offers low impedance to this fundamental frequency. Furthermore, the parallel blocking network 44 is tuned to the third harmonic frequency of the fundamental, which blocks and attenuates this third harmonic frequency. The third harmonic frequency has the highest amplitude of all of the undesirable frequencies and is substantially one third the value of the voltage of the fundamental frequency. Without the parallel blocking network 44, the filtering action of the series portion of the circuit would provide less filtering to the third harmonic than to the other odd harmonic frequencies. The harmonics of higher frequencies are of lesser amplitude and as the amplitude of the harmonic decreases, the effectiveness of this filter circuit increases. Thus, the series arm of the filtering circuit not only attenuates the third harmonic frequency but thus blocks the frequencies of the higher harmonics so that they exist only in a negligible quantity.

The parallel blocking network 48 is tuned to the fundamental frequency so as to offer high impedance to the fundamental. However, the network 48 will pass frequencies of the odd harmonics and further aid in their attenuation.

The circuit arrangement disclosed in FIG. 1 and as described above in accordance with the invention is one which uses a plurality of zener diodes in such a way as not to necessitate rectification and filtering of an alternating current input into a direct current signal, which would then have to be compared and remodulated for alternating current correction. Furthermore, the novel circuit arrangement, disclosed above in accordance with the invention, is one which provides a relatively short response time in the order of fractional parts of a millisecond. It is recognized that conventional direct current filtering circuits have a response time of around 15 milliseconds for medium accuracy and in the order of 100 to 500 milliseconds for very high accuracy.

The novel alternating current voltage reference system thus provides an accurate alternating current signal voltage with a minimum amount of variation and distortion and consisting of a single fundamental frequency and a frequency response time in the fractions of a millisecond. Such a device thus may be used to provide accurate signal and torquing inputs to such electromechanical instruments as gyroscopes, accelerometers, pressure gauges and other instruments, where it is desired to measure an unknown force, torque or pressure by nulling it out against an equal and opposite force. In applications with gyroscopes for example, it is often necessary to generate an accurately controlled precession rate.

The values of the several inductances and capacitors, in the filtering circuit described above, may obviously be within any appropriate range of values to provide the resonance required of the circuit. Such values can be easily determined. However, the above values are given by way of example only and need not be limiting. The means for tuning the several variable inductances and capacitors are conventional and are only schematically indicated in FIG. 1.

The voltage reference circuit described above is that which provides an output voltage between terminal 46 and a second output terminal 54 of 6 volts. Such a circuit has provided a constant voltage varying only in the order of one quarter of 1 percent and with a distortion of less than 2 percent. A voltage reference circuit of the type described has been operated with input frequencies lying in the range of 50 to 2000 cycles per second.

Because of the presence of the semiconductor diodes for certain applications, it may be desirable to control the ambient temperature of the device. Under these circumstances the voltage reference circuit may be completely enclosed within an insulated container having a thermostatically controlled heater element which will maintain a substantially constant optimum temperature with variations in ambient temperatures between a $-55°$ C. to a $+100°$ C. The reference system has a reduced accuracy of a .4 percent variation between the temperatures of $100°$ C. and $125°$ C.

The voltage reference system described above is one containing no vacuum tubes or gas tubes of any type together with their power requirements.

I claim:

An alternating current voltage reference device comprising a source of unregulated alternating current voltage, a clipping circuit network connected to said voltage source and comprising a parallel circuit having two branches, one of said two parallel circuit branches including a pair of double anode zener diodes to provide a modified square wave voltage output, the other of said two parallel circuit branches including a double anode zener diode to convert said modified square wave voltage output into a square wave voltage output, and a filter circuit connected across the last mentioned diode to attenuate the harmonic frequencies of said square wave voltage output, said filter circuit including a series circuit tuned to the fundamental frequency of the square wave and having a first inductance and a capacitor connected in series with a first blocking circuit comprising a second inductance and a first variable capacitor connected in parallel and tuned to the third harmonic of said square wave voltage output, a pair of output terminals in said filter circuit, and a second blocking circuit connected electrically between said output terminals and comprising a third inductance and a second variable capacitor connected in parallel and tuned to the fundamental frequency of said square wave voltage output.

References Cited in the file of this patent

UNITED STATES PATENTS

| | | |
|---|---|---|
| 2,682,031 | Pocock | June 22, 1954 |
| 2,789,254 | Bodle et al. | Apr. 16, 1957 |
| 2,814,021 | Oswald | Nov. 19, 1957 |
| 2,854,651 | Kircher | Sept. 30, 1958 |
| 2,979,677 | Clark | Apr. 11, 1961 |
| 2,980,809 | Jeszner | Apr. 18, 1961 |
| 2,984,780 | Koletsky | May 16, 1961 |